US012775117B2

(12) United States Patent
Li et al.

(10) Patent No.: US 12,775,117 B2
(45) Date of Patent: Oct. 27, 2026

(54) USING DEEP-LEARNING MODELS TO AUTOMATICALLY IDENTIFY SUBSURFACE RESERVOIR BOUNDARIES IN REAL TIME

(71) Applicant: Schlumberger Technology Corporation, Sugar Land, TX (US)

(72) Inventors: Zhenhua Li, Singapore (SG); Fei Wang, Tianjin (CN); Farid Toghi, Beijing (CN); Soazig Leveque, Seria (CN); Bingqi Liu, Beijing (CN); Ji Li, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 529 days.

(21) Appl. No.: 18/480,650

(22) Filed: Oct. 4, 2023

(65) Prior Publication Data

US 2025/0116176 A1 Apr. 10, 2025

(51) Int. Cl.

| | |
|---|---|
| ***G01V 3/38*** | (2006.01) |
| ***E21B 7/04*** | (2006.01) |
| ***G06N 3/045*** | (2023.01) |

(52) U.S. Cl.

CPC .................. *G01V 3/38* (2013.01); *E21B 7/04* (2013.01); *E21B 2200/22* (2020.05); *G01V 2200/16* (2013.01); *G01V 2210/66* (2013.01); *G06N 3/045* (2023.01)

(58) Field of Classification Search

CPC ........ G01V 3/38; G01V 3/26; G01V 2200/16; G01V 2210/66; G06N 3/045; E21B 7/04; E21B 2200/22

See application file for complete search history.

(56) References Cited

U.S. PATENT DOCUMENTS 11,328,430 B2 * 5/2022 Zhou .......................... G06T 7/11
11,428,077 B2 * 8/2022 Xu .......................... E21B 41/00
(Continued)

FOREIGN PATENT DOCUMENTS

| | | | |
|---|---|---|---|
| CA | 3214288 | A1 | 9/2022 |
| WO | 2022198220 | A1 | 9/2022 |

OTHER PUBLICATIONS

Liu, B., et al. "Deep Learning Inversion of Electrical Resistivity Data" IEEE Transactions on Geoscience & Remote Sensing, vol. 58, No. 8 (2020) (Year: 2020).*

(Continued)

*Primary Examiner* — Jay Hann
(74) *Attorney, Agent, or Firm* — Kyle R. Miiller

(57) ABSTRACT

The disclosure focuses on using a boundary identification system to actively determine borders and boundaries in subsurface geological features, such as reservoirs. In various implementations, the boundary identification system uses an ensemble image model leveraging multiple image-to-image machine-learning models to efficiently and accurately generate reservoir boundaries from inversion result profiles and images. In many instances, the boundary identification system generates reservoir boundaries from inversion results in real-time. Additionally, in some instances, the boundary identification system further improves the accuracy of the ensemble image model by diversifying the inputs and using ensembling on the individual model outputs during inference.

16 Claims, 7 Drawing Sheets

(56) References Cited

U.S. PATENT DOCUMENTS

| | | | | |
|---|---|---|---|---|
| 11,693,139 | B2 * | 7/2023 | Denli | G01V 1/301<br>702/16 |
| 12,067,730 | B2 * | 8/2024 | Lin | G06V 10/25 |
| 12,340,550 | B2 * | 6/2025 | Cortes | G06V 10/82 |
| 2021/0311221 | A1 | 10/2021 | Roy et al. | |
| 2022/0099855 | A1 | 3/2022 | Li et al. | |
| 2024/0176036 | A1 | 5/2024 | Zhao | |
| 2024/0312202 | A1 * | 9/2024 | Jiang | G01V 1/306 |
| 2024/0393488 | A1 * | 11/2024 | Sun | E21B 49/00 |
| 2025/0225298 | A1 | 7/2025 | Cuevas | |
| 2025/0225300 | A1 | 7/2025 | Cuevas | |
| 2025/0347214 | A1 * | 11/2025 | Yang | E21B 44/00 |

OTHER PUBLICATIONS

Clegg, N., et al. "Confidence in Subsurface Inversion Models Generated from Electromagnetic Logging While Drilling Data" Society Petroleum Engineers, SPE-210374-MS (2022) (Year: 2022).*

Ronneberger, O. et al., "U-Net: Convolutional Networks for Biomedical Image Segmentation" arXiv:1505.04597v1, May 18, 2015, pp. 1-8.

"Zhou, Z. et al., "UNet++: Redesigning Skip Connections to Exploit Multiscale Features in Image Segmentation"", arXiv: 1912.05074v2, Jan. 28, 2020, pp. 1-12.

Puzyrev Vladimir, "Deep learning electromagnetic inversion with convolutional neural networks", Geophysical Journal International, vol. 218, No. 2, Aug. 1, 2019, pp. 817-832.

* cited by examiner

USING DEEP-LEARNING MODELS TO AUTOMATICALLY IDENTIFY SUBSURFACE RESERVOIR BOUNDARIES IN REAL TIME

BACKGROUND

Many natural resources are located underground. These natural resources include water reservoirs and hydrocarbon reservoirs such as natural gas and oil. To access these natural resources, downhole drilling systems may drill a wellbore along a trajectory path to a target location, formation, or geological feature. Modern drilling systems take numerous measurements underground to determine geological features along the trajectory path. Many existing drilling systems, however, use inefficient, complex, and laborious approaches to interpret subsurface features.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
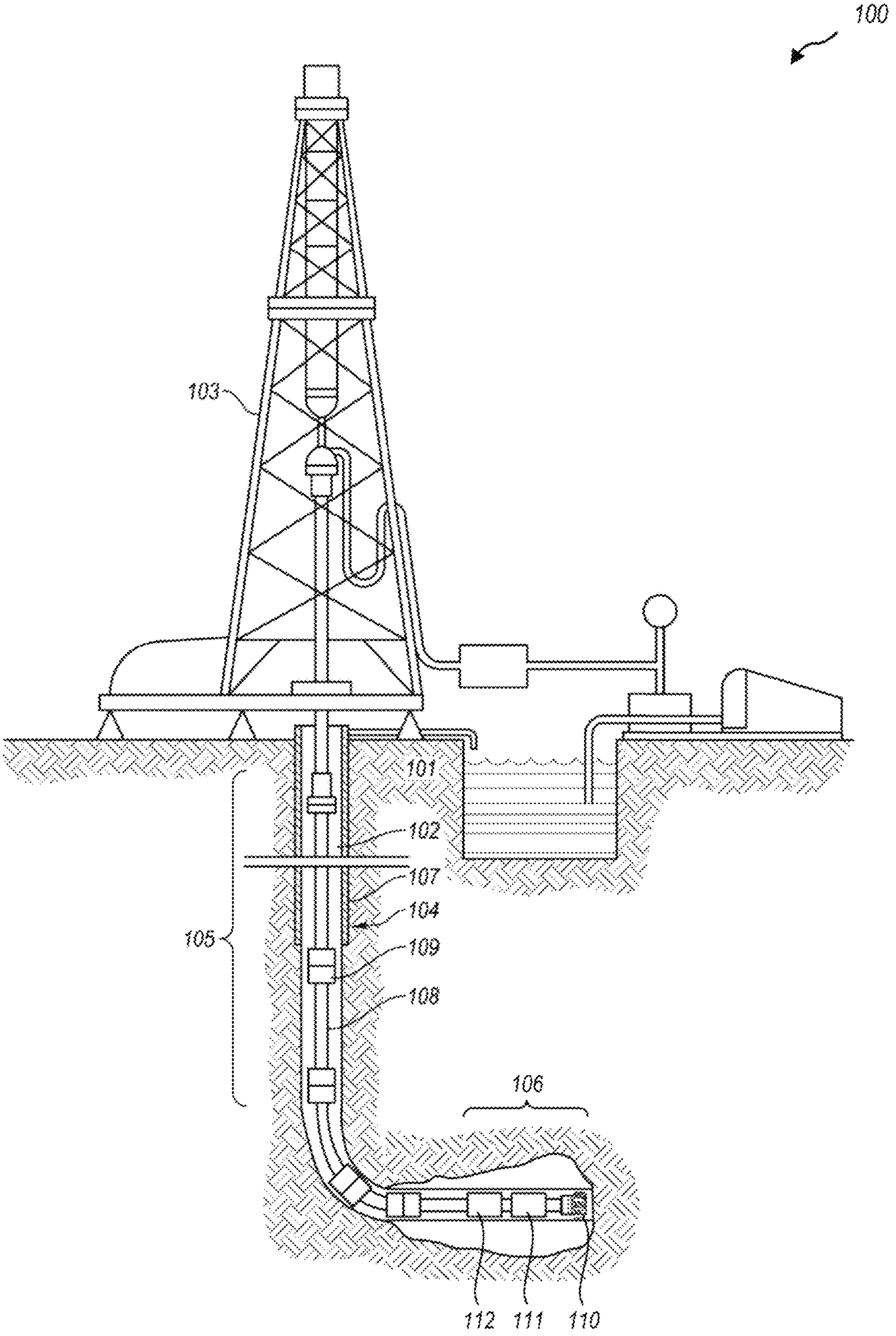
FIG. 1 is a representation of a drilling system for drilling an earth formation to form a wellbore.

This disclosure describes using a boundary identification system to actively determine borders and boundaries in subsurface geological features, such as reservoirs. In various implementations, the boundary identification system uses an ensemble image model leveraging multiple image-to-image machine-learning models to efficiently and accurately generate reservoir boundaries from inversion result profiles and images. In many instances, the boundary identification system generates reservoir boundaries from inversion results in real-time. Additionally, in some instances, the boundary identification system further improves the accuracy of the ensemble image model by diversifying the inputs and using ensembling on the individual model outputs during inference.

In particular, this disclosure relates to devices, systems, and methods for determining subsurface geological feature boundaries in a drilling system using deep-learning models, model ensembling, test-time augmentations, real-world training data, and/or real-time inputs. In this disclosure, these devices, systems, and methods are described in the context of a boundary identification system, which automatically delineates the boundaries of reservoirs in real time from real-time data from a growing longitudinal electromagnetic (EM) inversion result profile. The predicted reservoir boundaries accurately generated by the boundary identification system have numerous applications such as real-time geosteering and improving downstream models.

According to various implementations, the boundary identification system receives an inversion image that is part of a longitudinal electromagnetic inversion result profile indicating subsurface measurements captured by a downhole resistivity sensor. In response, the boundary identification system generates an image mask for the inversion image using an ensemble image model that aggregates the initial image masks generated by multiple image-to-image machine-learning models into a single image mask. In addition, the boundary identification system augments the inversion image by adding labels indicating the top and base boundaries of a subsurface reservoir using the image mask. Furthermore, the boundary identification system augments the longitudinal electromagnetic inversion result profile to include the newly determined reservoir boundaries.

As described in this disclosure, including the following paragraphs, the boundary identification system delivers several significant technical benefits in terms of computing efficiency, accuracy, and flexibility compared to existing systems. Moreover, the boundary identification system provides practical applications that address problems related to determining reservoir boundaries of subsurface reservoirs in real-time within drilling systems. For example, the geological insights generated by the boundary identification system play a crucial role in enabling real-time auto-geosteering.

As previously mentioned above, existing drilling systems suffer from several problems resulting in inefficiencies and inaccuracies. To elaborate, many existing systems rely on experts, such as well placement experts (WPEs), to manually decipher, decode, and estimate reservoir boundaries from captured downhole data. This has led to inaccurate and inconsistent results among different experts due to the subjectivity differences. Additionally, when attempting to perform the task in real-time, the high-intensity nature of the task frequently led to errors by experts, which were discovered when drilling unexpectedly breached a reservoir boundary.

Some existing systems attempted to automate the process. However, these systems were unsuccessful due to random noises and potential artifacts in longitudinal EM inversion results. Indeed, these systems failed to meet minimum accuracy and efficiency standards. Additionally, many of these systems competed against the experts rather than leveraging and incorporating their knowledge as an asset to improve prediction results.

In contrast to existing systems, the boundary identification system generates highly accurate reservoir boundary predictions. In various implementations, the boundary identification system uses an ensemble image model that leverages multiple image-to-image machine-learning models (or other deep-learning models) to predict reservoir boundaries from longitudinal EM inversion results. Researchers have found that the ensemble image model disclosed in this document achieves an accuracy rate of 90% when predicting reservoir boundaries in real-time.

In addition to providing highly accurate results, the boundary identification system efficiently ensures consistency in its results. These accurate and consistent results have been achieved with a relatively small amount of training data, approximately (e.g., approximately 300 images and their derivatives). As feedback is provided and the amount of training data grows, the boundary identification system will further improve in accuracy and consistency. This reduces, or at least significantly minimizes, the need for expert input in the process.

Furthermore, the reservoir boundary prediction results generated by the boundary identification system contribute to various practical applications. For example, since the boundary identification system generates reservoir boundaries in real time, a drilling system may use these results to determine a trajectory path with high accuracy, enable auto-geosteering of a corresponding drill, and improve the accuracy of downstream models and workflows that rely on precise knowledge of reservoir boundary mapping.

As illustrated in the following discussion, this disclosure uses a variety of terms to describe the features and advantages of one or more implementations described in this disclosure. Additional details are now provided to clarify the meaning of some of these terms, while details regarding other terms may be provided later in the document.

In this disclosure, the term "longitudinal electromagnetic inversion results" (referred to as "inversion results") refers to mappings of the area surrounding a wellbore that involve measurement (using a downhole resistivity sensor) and/or analysis of electromagnetic (EM) fields (e.g., subsurface measurements) in a specific direction, typically along the length of the borehole or drill hole. This is done to gather information about subsurface structures and geological formations. In many cases, inversion results are generated by using the collected data to reconstruct or infer properties of the subsurface by modeling the relationship between the measured data and the unknown subsurface properties.

The term "longitudinal electromagnetic inversion result profile" (referred to as "inversion result profile") refers to a graphical representation of a subsurface geological feature or data along a vertical or longitudinal profile. An inversion result profile includes longitudinal electromagnetic inversion results, which are often presented as inversion images.

The terms "inversion image" and "inversion result image" refer to a segment of an inversion result profile. For instance, multiple inversion images combine to create an inversion result profile. Further, inversion result profiles continuously evolve as real-time data is received. For instance, an inversion result profile initially includes one inversion image, then three inversion images, and as additional real-time resistivity data arrives, a fourth inversion image is added to the inversion result profile.

The term "reservoir" refers to a subsurface rock formation with sufficient porosity and permeability to store and transmit fluids, often hydrocarbons or water. The term "reservoir boundary" refers to the outer limit or edge of an underground geological formation that contains a significant quantity of hydrocarbons, such as oil or natural gas. A reservoir boundary defines the area within which valuable hydrocarbon resources are trapped and may be extracted. Reservoir boundaries are crucial for determining the size and extent of a reservoir. Typically, reservoir boundaries are determined by geological factors such as rock types, stratigraphy, and structural features like faults or anticlines. Reservoir boundaries usually encompass a top or ceiling boundary and a bottom or base boundary. Reservoir boundaries may also include side, cap, or end boundaries.

The term "augmented inversion image" refers to an inversion image that includes labels or another type of indication adding information to and/or modifying the original inversion image. For example, an augmented inversion image includes reservoir boundary labels showing a top border and/or a base border. Likewise, the term "augmented longitudinal electromagnetic inversion result profile" refers to a longitudinal electromagnetic inversion result profile augmented with labels (e.g., boundary labels) or other supplementary information.

As used herein, a "geological feature" may be any element of a geological formation. For instance, a geological feature may include a geological structure, such as a formation. A geological feature may include the entire geological structure. A geological feature may include a volume of space, including one or more structures, rock types, material types, and so forth. In some embodiments, a geological feature may include a boundary between two geological structures, such as a boundary between strata. In some embodiments, a geological feature may include a boundary between rock types. In some embodiments, a geological feature may include a specific structure of a set of structures, such as a fluid reservoir. A geological feature may be three-dimensional. For example, a geological feature may include a three-dimensional surface having variations in latitude, longitude, and depth.

As used herein, the term "uphole" refers to a direction of a wellbore, taken from the bit or another feature of the drilling system, that is toward the collar of the wellbore or a location that is closer to the collar of the wellbore. The term "downhole" refers to a direction of the drilling system that is away from the collar of the wellbore or a location that is toward the drill bit and moving away from the collar of the wellbore. The term downhole may also include the target path or trajectory of the wellbore beyond the drill bit within the wellbore (e.g., earth not yet drilled).

The term "machine-learning model" refers to a computer model or computer representation that may be trained (e.g., optimized) based on inputs to approximate unknown functions. For instance, a machine-learning model may include, but is not limited to, a neural network (e.g., a convolutional neural network (CNN) or deep learning model), a decision tree (e.g., a gradient-boosted decision tree), a linear regression model, a logistic regression model, or a combination of these models.

As another example, the term "neural network" refers to a machine learning model comprising interconnected artificial neurons that communicate and learn to approximate complex functions, generating outputs based on multiple inputs provided to the model. For instance, a neural network includes an algorithm (or set of algorithms) that employs deep learning techniques and uses training data to adjust the parameters of the network and model high-level abstractions in data. Various types of neural networks exist, such as convolutional neural networks (CNNs), residual learning neural networks, recurrent neural networks (RNNs), generative neural networks, generative adversarial neural networks (GANs), and single-shot detection (SSD) networks.

Additional terms are defined throughout the disclosure in connection with various examples and contexts.

Turning now to the figures, additional details are provided regarding the components and features of the boundary identification system. Additional example implementations and details of the boundary identification system are discussed in connection with the accompanying figures.

FIG. 1 shows an example representation of a drilling system for drilling an earth formation to create a wellbore. FIG. 1 provides context regarding a drilling system to which the boundary identification system often belongs. To illustrate, FIG. 1 shows one example of a drilling system 100 used for drilling an earth formation 101 to form a wellbore 102. The drilling system 100 includes a drill rig 103 used to rotate a drilling tool assembly 104 which extends downward into the wellbore 102. The drilling tool assembly 104 may include a drill string 105, a bottom hole assembly (BHA 106), and a bit 110, attached to the downhole end of the drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through nozzles, jets, or other openings in the bit 110 for purposes such as cooling the bit 110 and its cutting structures, lifting cuttings out of the wellbore 102 during drilling, controlling fluid influx in the well, maintaining wellbore integrity, and other functions.

The BHA 106 may include the bit 110 or other components. An example BHA 106 may include additional or different components (e.g., coupled between the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or damping tools, other components, or combinations of these components.

The BHA 106 may further include a directional tool 111 such as a bent housing motor or a rotary steerable system (RSS). The directional tool 111 may include directional drilling equipment that changes the direction of the bit 110, thereby altering the trajectory of the wellbore 102. In some cases, at least a portion of the directional tool 111 may maintain a geostationary position relative to an absolute reference frame, such as gravity, magnetic north, or true north. Using measurements obtained from this geostationary position, the directional tool 111 may locate the bit 110, modify its course, and guide the directional tool 111 along a projected trajectory. For instance, the BHA 106 (including the directional tool 111) is shown transitioning from vertical to horizontal drilling, causing the bit 110 to move along a horizontal path away from the drill rig 103.

In general, the drilling system 100 may include additional or different drilling components and accessories including special valves (e.g., blowout preventers and safety valves). Additional components within the drilling system 100 may be categorized as part of the drilling tool assembly 104, the drill string 105, or part of the BHA 106 depending on their specific locations within the drilling system 100.

The bit 110 in the BHA 106 may be any type of bit suitable for degrading downhole materials such as the earth formation 101. Example types of drill bits used for drilling earth formations are fixed-cutter or drag bits, roller cone bits, and combinations thereof. In other embodiments, the bit 110 may be a mill used for removing metal, composite, elastomer, or other downhole materials, or combinations thereof. For instance, the bit 110 may be used with a whipstock to mill into casing 107 lining the wellbore 102. The bit 110 may also be a junk mill used to mill away tools, plugs, cement, or other materials within the wellbore 102, or combinations thereof. Swarf or other cuttings formed by the use of a mill may be lifted to the surface or may be allowed to fall downhole. In still other embodiments, the bit 110 may include a reamer. For instance, an underreamer may be used in connection with a drill bit, and the drill bit may bore into the formation while the underreamer enlarges the size of the bore.

While performing drilling activities, a subsurface structure system may prepare geological projections of various geological features of the earth formation 101. These projections may be located around geological features of interest, such as formations to be drilled through, reservoir boundaries, and so forth. A drilling operator may prepare a target trajectory or a target path of the wellbore 102. For example, the wellbore 102 may follow a projected trajectory, which may be based on the projected geological features. For example, the projected trajectory avoids crossing the projected geological feature.

The subsurface structure system may receive information regarding the earth formation 101 based on one or more sets of survey data. For example, the geological projection system may receive seismic survey data from a seismic survey. The seismic survey may be conducted from the surface of the drilling system 100 and may include seismic data for a large portion of the earth formation 101, including the target path of the wellbore 102. Using the seismic data, the geological projection system may identify one or more seismic surfaces of a geological feature.

The BHA 106 may include resistivity sensors 112 (e.g., a downhole resistivity sensor). The resistivity sensors 112 may collect resistivity sensor data from the earth formation 101 uphole of the bit 110. Resistivity sensor data may be collected by transmitting an electromagnetic field through the earth formation 101. The variation in the electromagnetic field through the earth formation 101 may represent the resistivity of the earth formation 101.

Resistivity sensor data may be used to determine the geological properties of the earth formation 101. For example, the resistivity sensor data may be used to determine one or more geological surfaces or structures. In some situations, the sensed surface of the geological features determined using the resistivity sensor data may be more accurate or representative of the actual geological feature of the earth formation 101 than the seismic surface. This may be because one or more of the resistivity sensors 112 are located downhole, and therefore closer to the relevant geological structures of the earth formation 101 than the seismic survey instrument.

As described in this disclosure the boundary identification system may use measurements, such as inversion results and inversion result profiles that include resistivity data to determine reservoir boundaries of geological surfaces or structures. In particular, the boundary identification system uses various deep-learning models (e.g., image-to-image machine-learning model) to accurately predict reservoir boundaries of subsurface reservoirs.

In some instances, the boundary identification system automatically corrects and/or enables a drilling operator to make more informed decisions regarding drilling parameters, including the trajectory of the wellbore. For example, based on the reservoir boundaries, the boundary identification system modifies a projected trajectory of a wellbore to avoid a particular reservoir boundary. This may help improve wellbore quality, reduce wear and tear on drilling equipment, improve the rate of penetration, improve wellbore production, and provide other benefits.

Figure 2:
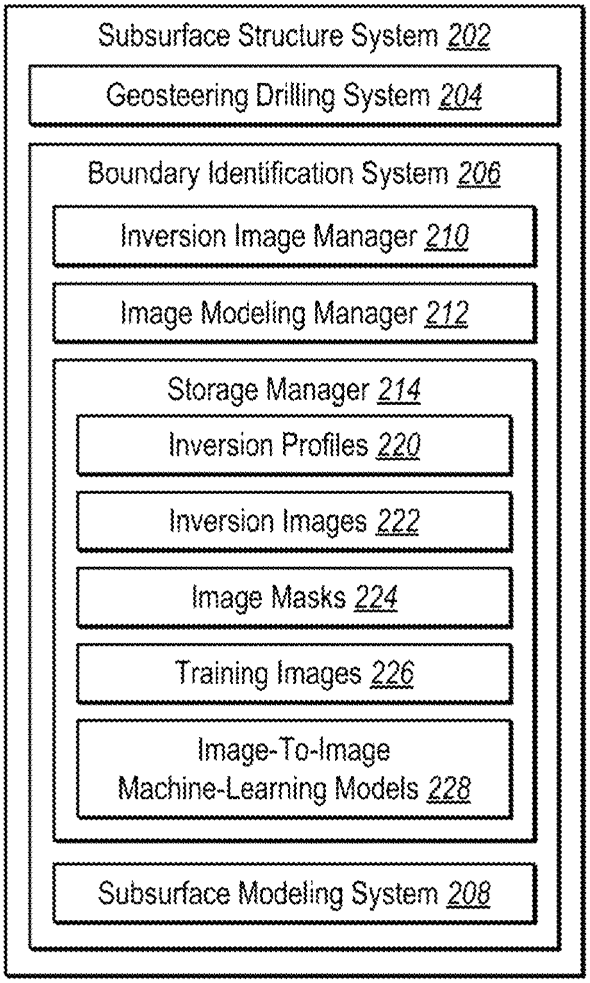
FIG. 2 illustrates an example subsurface structure system where a boundary identification system is implemented in connection with a drilling system.

With the framework of the drilling system and an example operating environment described, this disclosure will now focus on describing implementations of the boundary identification system. To illustrate, FIG. 2 shows an example of a subsurface structure system 202 implementing a boundary identification system 206. The subsurface structure system 202 includes various computing devices and systems. As shown, the subsurface structure system 202 includes a geosteering drilling system 204, the boundary identification system 206, and a subsurface modeling system 208. Each of these systems may be implemented on one or more computing devices.

The subsurface structure system 202 may include additional devices and components not shown. Additionally, while FIG. 2 shows example arrangements and configurations of the subsurface structure system 202 and/or the boundary identification system 206, other arrangements and configurations are possible. Further, details regarding computing devices are provided below in connection with FIG. 7.

In various implementations, the geosteering drilling system 204 precisely controls the direction and trajectory of a drill and/or wellbore as it progresses through the subsurface formations. In various instances, a geosteering drilling system 204 uses real-time data analysis with precise drilling control to navigate through subsurface formations, maximize reservoir contact, minimize drilling risks, and optimize the placement of wellbores in hydrocarbon reservoirs. The geosteering drilling system 204 operates with the boundary identification system 206 to identify reservoir boundaries and perform drill control optimization. In various implementations, the geosteering drilling system 204 automatically modifies a projected trajectory based on reservoir boundaries provided by the boundary identification system 206.

In some implementations, the subsurface modeling system 208 uses one or more tools to collect and analyze data from below the Earth's surface. The subsurface modeling system 208 may use various instruments and methods designed for measuring and monitoring conditions, properties, and processes in subsurface environments, such as underground reservoirs, geological formations, and aquifers. In various implementations, a subsurface modeling system 208 includes sensors, probes, well-logging equipment, and remote sensing technologies to provide subsurface information. For example, the subsurface modeling system 208 uses downhole resistivity sensors to provide subsurface resistivity measurements, which may be used to generate inversion results and inversion result profiles of a wellbore. Additionally, in some instances, the subsurface modeling system 208 creates 1D, 2D, or 3D representations of a subsurface area, which may indicate crucial geological features and rock properties.

As shown, the subsurface structure system 202 includes the boundary identification system 206, which may communicate with the geosteering drilling system 204 and the subsurface modeling system 208. The boundary identification system 206 includes an inversion image manager 210, an image modeling manager 212, and a storage manager 214. The storage manager 214 includes inversion result profiles 220, inversion images 222, image masks 224, training images 226, and image-to-image machine-learning models 228. The boundary identification system 206 may include additional or different components, as previously mentioned above.

The boundary identification system 206 may be located as part of a downhole assembly, located at the surface, or located at various locations. For example, in some instances, the boundary identification system 206 is located near a downhole resistivity sensor near the drill and determines reservoir boundaries in real time as data is received. In some implementations, the boundary identification system 206 determines reservoir boundaries at the surface and allows WPEs to modify a trajectory path based on the reservoir boundaries it determines.

In various implementations, the inversion image manager 210 obtains inversion result profiles 220 and inversion images 222 from the subsurface modeling system 208. In many instances, the inversion image manager 210 obtains the inversion images in real time. For example, the subsurface modeling system 208 provides inversion bars that make up one or more of the inversion images 222. The inversion image manager 210 may provide the inversion images 222 to the image modeling manager 212 to determine reservoir boundaries within the inversion result profiles 220 and/or inversion images 222 that are made up of the inversion images 222.

In various implementations, the image modeling manager 212 determines reservoir boundaries for a reservoir detected in inversion result profiles 220. For example, the image modeling manager 212 uses one or more of the image-to-image machine-learning models 228 to generate image masks 224 of input images (e.g., inversion images 222). The image-to-image machine-learning models 228 include different types of image-to-image machine-learning models, such as image segmentation machine-learning models with neural network architectures (e.g., U-Net, U-Net++, Mask R-CNN, transformer-based models, large generative model-based segmentation neural networks, etc.).

Based on the image masks 224, the image modeling manager 212 may generate augmented inversion images and augmented inversion result profiles indicating the location of reservoir boundaries. Additional details regarding determining reservoir boundaries using machine-learning models are provided below in connection with FIG. 3.

Figure 3:
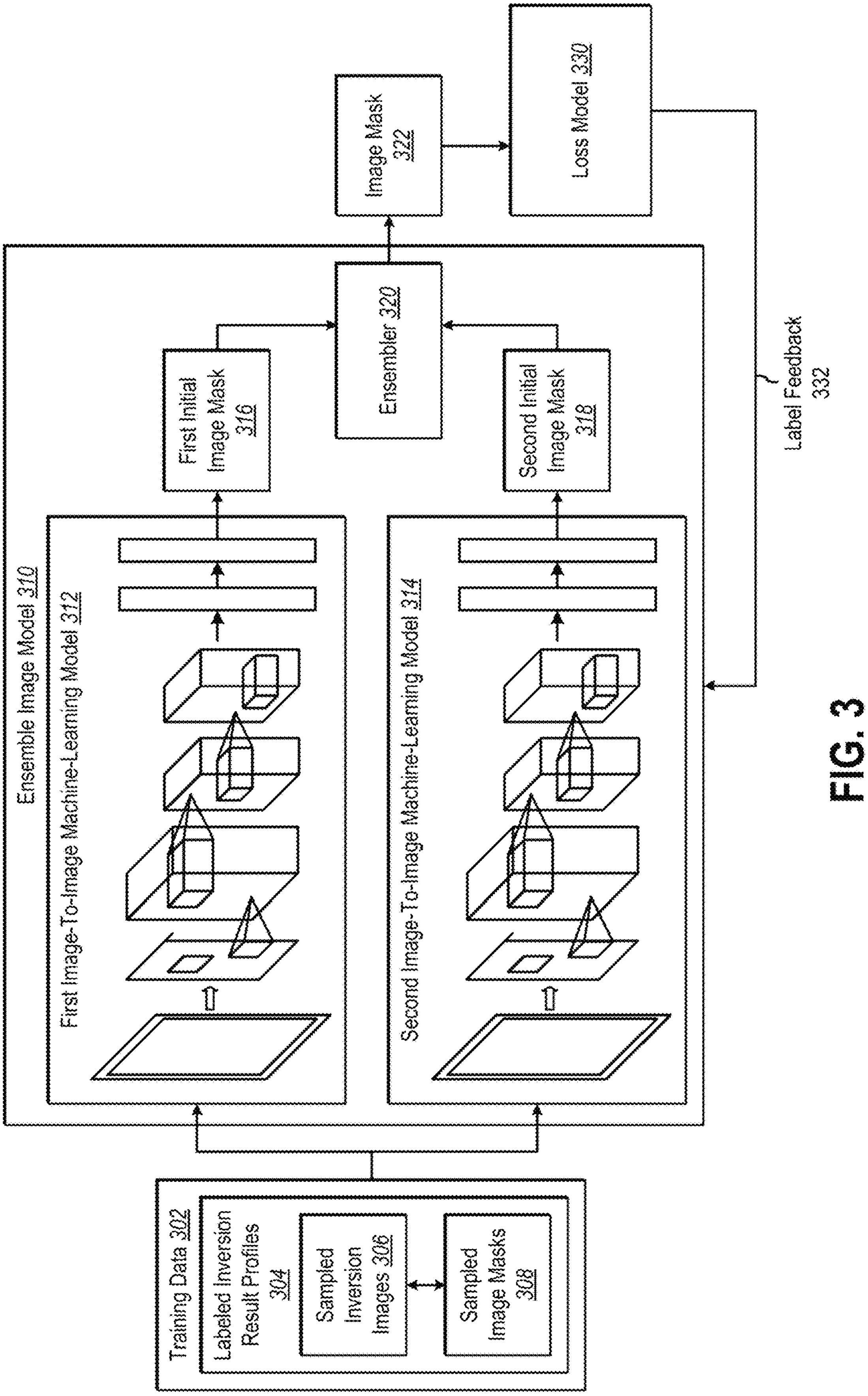
FIG. 3 illustrates an example block diagram of training image-to-image machine-learning models within an ensemble image model with real-world data.
Figure 5:
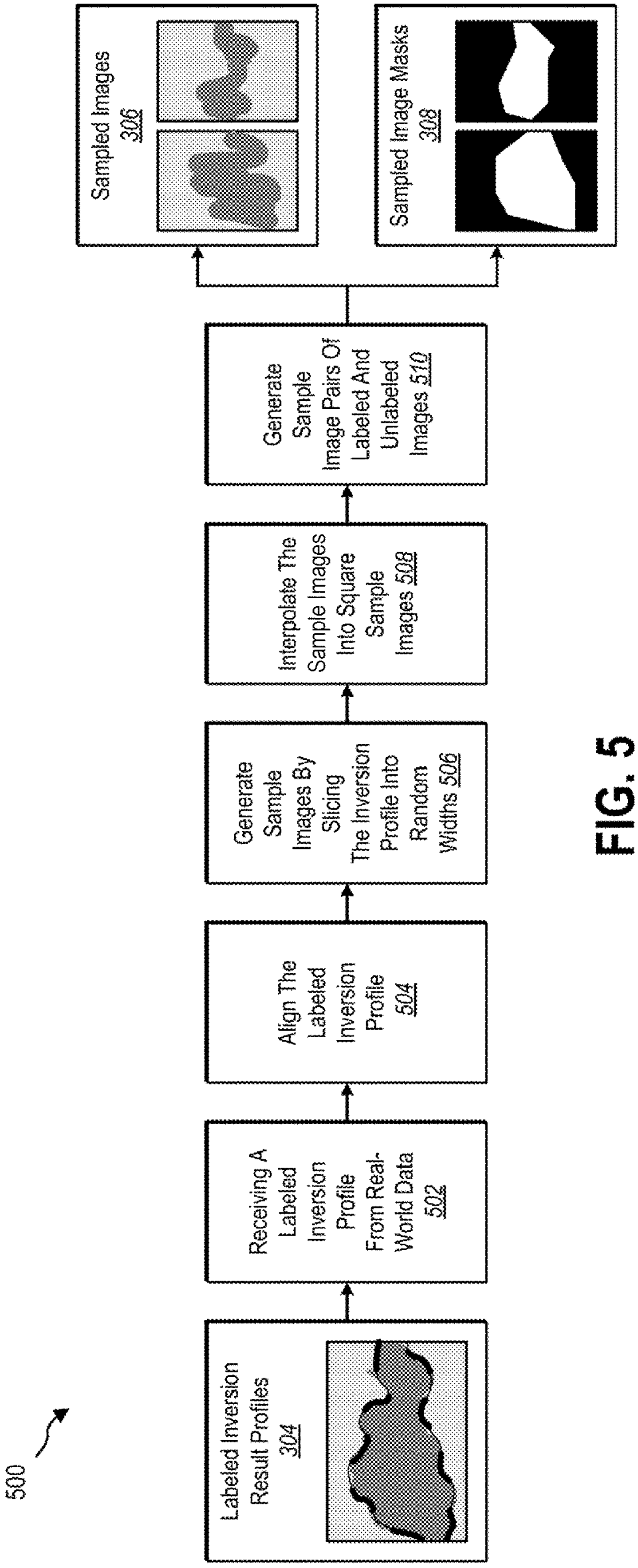
FIG. 5 illustrates an example block diagram of generating the training data from real-world data.

In various implementations, the image modeling manager 212 generates training images 226 that include non-labeled and corresponding labeled images to train a machine-learning model. Additionally, FIG. 3 and FIG. 5 illustrate generating training data to train one or more image-to-image machine-learning models.

Each of the components of the subsurface structure system 202 and/or the boundary identification system 206 may be implemented in software, hardware, or both. For example, the components of the boundary identification system 206 may include instructions stored on a computer-readable storage medium that may be executable by at least one processor of one or more computing devices. When executed by the processor, the computer-executable instructions of the subsurface structure system 202 may cause a computing device to perform the methods described herein. As another example, the components of boundary identification system 206 may include hardware, such as a special-purpose processing device to perform a certain function or group of functions. In some instances, the components of the boundary identification system 206 may include a combination of computer-executable instructions and hardware.

Furthermore, the components of the subsurface structure system 202 and/or the boundary identification system 206 may be implemented as one or more operating systems, stand-alone applications, modules of an application, plug-ins, library functions, functions called by other applications, and/or cloud-computing models. Furthermore, the components of the boundary identification system 206 may be implemented as one or more web-based applications hosted on a remote server and/or implemented in a suite of mobile device applications or "apps."

As previously mentioned, the boundary identification system 206 uses an ensemble image model that includes multiple image-to-image machine-learning models to generate image masks. These image masks are then used to determine reservoir boundaries for a reservoir surrounding or adjacent to a wellbore. Accordingly, FIG. 3 illustrates an example block diagram of training image-to-image machine-learning models within an ensemble image model using real-world data and FIG. 4 below illustrates an example block diagram of using the ensemble image model to generate an augmented inversion result profile.

As also mentioned earlier, FIG. 3 illustrates an example block diagram of the training of image-to-image machine-learning models within an ensemble image model with real-world data according to some implementations. As shown, FIG. 3 includes training data 302, the ensemble image model 310, and a loss model 330. The training data 302 includes labeled inversion result profiles 304 having the sampled inversion images 306 and sampled image masks 308 corresponding to the sampled inversion images 306. In one or more implementations, the sampled inversion images 306 include portions of the labeled inversion result profiles 304 (e.g., unlabeled portions) and the sampled image masks 308 include corresponding labeled portions. Additional details regarding generating the training data 302 are provided below in connection with FIG. 5.

FIG. 3 also includes the ensemble image model 310. As shown, the ensemble image model 310 includes a first image-to-image machine-learning model 312 and a second image-to-image machine-learning model 314. In various implementations, the image-to-image machine-learning models are image segmentation machine-learning models with neural network architectures, similar to the model types described above. In some instances, the ensemble image model 310 includes additional image-to-image machine-learning models.

As one of many possible examples, at least one of the image-to-image machine-learning models is a convolutional neural network (CNN) that includes several neural network layers, such as lower neural network layers that form an encoder and higher neural network layers that form a decoder. For example, the encoder maps or encodes input images into feature vectors (i.e., latent object feature maps or latent object feature vectors) by processing each input image through various neural network layers (e.g., convolutional, ReLU, and/or pooling layers) to encode pixel data from the input images into feature vectors (e.g., a string of numbers in vector space representing the encoded image data). For instance, the encoder of an image-to-image machine-learning model processes input images to encode image features corresponding to reservoir boundaries from inversion images.

Additionally, in various implementations, an image-to-image machine-learning model includes higher neural network layers that form a decoder, which may include fully connected layers and/or a classifier function (e.g., a SoftMax or a sigmoid function). In these implementations, the decoder processes the feature vectors to decode detected reservoir boundaries in an input image and generate a segmented image mask indicating portions of the input image that are within a reservoir and portions that are outside of the reservoir.

In many instances, the first image-to-image machine-learning model 312 and the second image-to-image machine-learning model 314 are different types of image segmentation models and/or trained to generate different output granularities. For example, the first image-to-image machine-learning model 312 is a U-Net neural network and the second image-to-image machine-learning model 314 is a U-Net++. In certain implementations, the first image-to-image machine-learning model 312 includes a single multi-modal image-to-image neural network, such as a generative learning model or a large language model.

As shown, the first image-to-image machine-learning model 312 generates a first initial image mask image 316. Similarly, the second image-to-image machine-learning model 314 generates a second initial image mask image 318. Because the first image-to-image machine-learning model 312 and the second image-to-image machine-learning model 314 are different, the first initial image mask image 316 and the second initial image mask image 318 differ.

To generate an image mask 322 (e.g., a single image mask) for an input image, the ensemble image model 310 includes an ensembler 320. In various implementations, the ensembler 320 combines the output from multiple individual models (e.g., the first image-to-image machine-learning model 312 and the second image-to-image machine-learning model 314) to improve the overall predictive performance and generalization of the ensemble. Indeed, by using the ensembler 320, the boundary identification system 206 improves accuracy, robustness, and generalization while reducing overfitting.

In one or more implementations, the ensembler 320 combines the first initial image mask image 316 and the second initial image mask image 318. For example, the ensembler 320 combines the masked pixels (e.g., the pixels indicating a reservoir) for each initial image mask, overwriting the non-masked pixels to generate the image mask 322 (e.g., a single image mask). Alternatively, the ensembler 320 combines the non-masked pixels (e.g., the pixels indicating the area outside of a reservoir) to generate the image mask 322.

In some implementations, the ensembler 320 aggregates the predictions between the first initial image mask image 316 and the second initial image mask image 318. For example, the ensembler 320 averages the predicted probabilities for the masked pixel and/or non-masked pixels. In various instances, the ensembler 320 aggregates the first initial image mask image 316 and the second initial image mask image 318 using a weighted average or majority vote when there are more than two image-to-image machine-learning models.

As shown, FIG. 3 includes the loss model 330, which may include one or more loss functions (e.g., cross-entropy loss and/or image similarity loss). In various implementations, the boundary identification system 206 uses the loss model 330 to determine an error or loss amount, which the boundary identification system 206 provides back to the ensemble image model 310 as label feedback 332 to train and fine-tune the image-to-image machine-learning models.

To further elaborate, in various implementations, the boundary identification system 206 compares the sampled image masks 308 to the image mask 322 using the loss model 330 to generate the label feedback 332 indicating an error or loss amount. The image mask 322 is generated by the ensemble image model 310 based on sampled inversion images 306 corresponding to the sampled image masks 308.

Additionally, in one or more implementations, the boundary identification system 206 uses the label feedback 332 to train and optimize the neural network layers of the image-to-image machine-learning models through techniques like backpropagation and/or end-to-end learning. In some implementations, the boundary identification system 206 uses an optimizer algorithm such as the Adam optimizer and/or another optimization algorithm for stochastic gradient descent (SGD) to train the deep learning models. Further, the boundary identification system 206 may iteratively fine-tune and train the image-to-image machine-learning models until they converge, for a set number of iterations, until the training data is exhausted, or until a satisfactory level of accuracy is achieved.

In various implementations, the boundary identification system 206 uses different data augmentation techniques and n-fold ensembles. For instance, the boundary identification system 206 augments the training data 302 to increase the robustness of the image-to-image machine-learning models. For example, the boundary identification system 206 creates instances of the training data 302 that are horizontally and/or vertically flipped, randomly rotated up to 90 degrees, randomly adjusted for brightness and contrast levels, subjected to color jittering, and/or modified based on random Gaussian noise values.

Once trained, in various implementations, the boundary identification system 206 uses the ensemble image model 310 to automatically generate image masks of inversion results and generate augmented (e.g., labeled) inversion result images and/or profiles. To illustrate, FIG. 4 illustrates an example block diagram of how the ensemble image model is used to generate an augmented inversion result profile.

Figure 4:
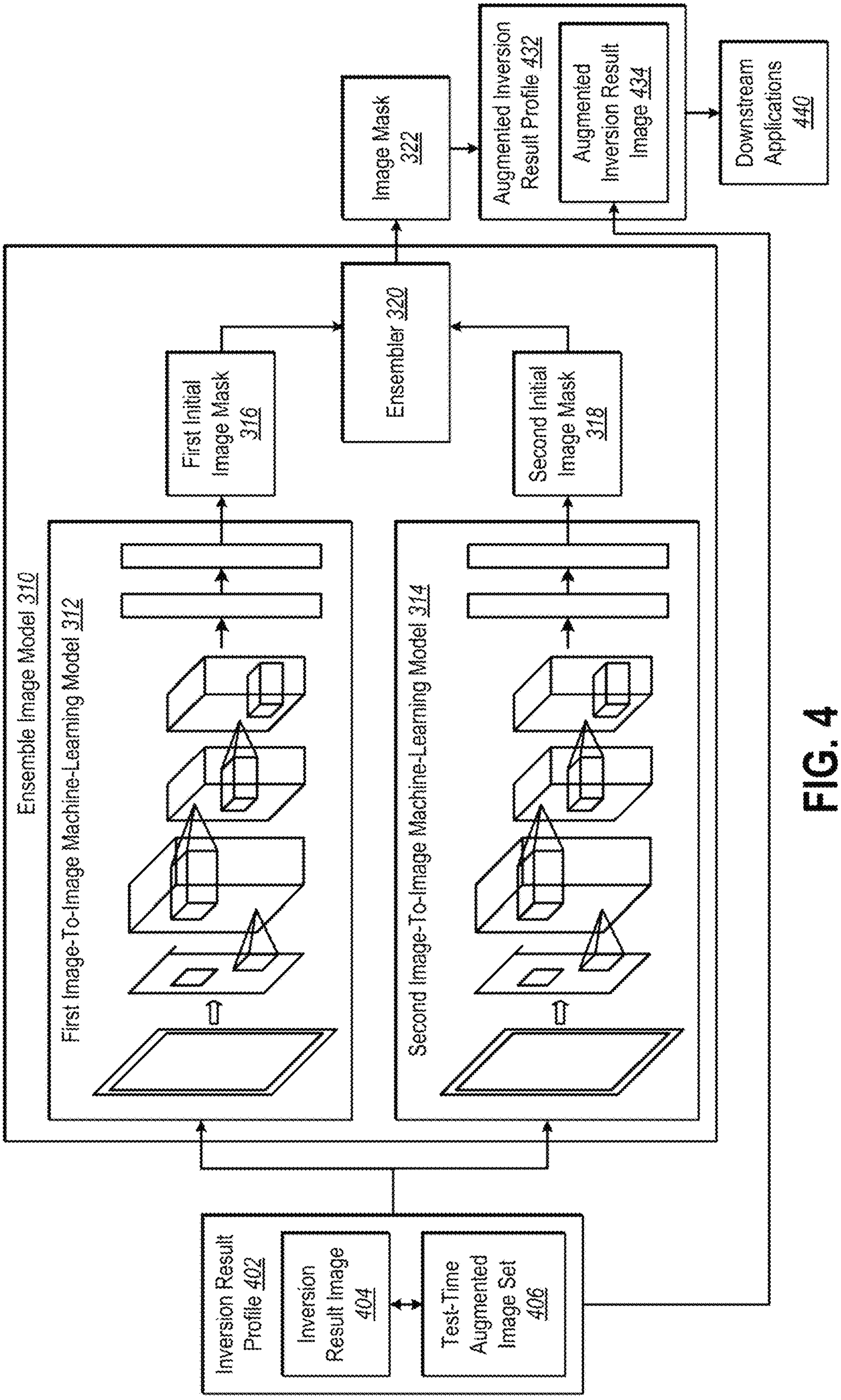
FIG. 4 illustrates an example block diagram of using the ensemble image model to generate an augmented inversion result profile.

As shown, FIG. 4 includes the ensemble image model 310 having the first image-to-image machine-learning model 312 and the second image-to-image machine-learning model 314. In this figure, these models represent trained models having tuned neural network layers and other trained components. FIG. 4 also includes an inversion result profile 402 having an inversion result image 404 and a test-time augmented image set 406. In addition, FIG. 4 includes an augmented inversion result profile 432 with an augmented inversion result image 434. Further, FIG. 4 includes downstream applications 440.

As shown, the boundary identification system 206 provides an input image from the inversion result profile 402 to the ensemble image model 310. In response, the ensemble image model 310 duplicates the input image, sending one copy to the first image-to-image machine-learning model 312 to produce the first initial image mask image 316 and another copy to the second image-to-image machine-learning model 314 to generate the second initial image mask image 318. Additionally, the boundary identification system 206 uses the ensembler 320 to generate the image mask 322 of the input image, before proceeding with additional operations on the image mask 322, which are described below.

The boundary identification system 206 may provide the inversion result image 404 as the input image for the ensemble image model 310. In various implementations, the inversion result image 404 is a portion of the inversion result profile 402. To elaborate, in many instances, the inversion result profile 402 is made of a series of inversion result images that combine, concatenate, and/or merge to form a longitudinal electromagnetic inversion result profile of geological features surrounding a wellbore. For example, as real-time data of horizontal bars are received, the boundary identification system 206 generates an inversion result image every 5, 10, or n-bars, which is then added to the inversion result profile.

In some instances, the boundary identification system 206 uses a newly generated inversion result image of real-time data as the input image. During these instances, the boundary identification system 206 generates single image masks in real-time as measuring data is received. In various implementations, the boundary identification system 206 clips, segments, or crops a section of the inversion result profile 402 to serve as the input image.

In one or more implementations, the boundary identification system 206 generates a test-time augmented (TTA) image set from the inversion result image 404 and provides this test-time augmented image set 406, along with the original inversion result image 404, to the ensemble image model 310. In various implementations, the test-time augmented image set 406 comprises multiple instances of the inversion result image 404, with each instance being modified using different image augmentations. For instance, one instance is vertically flipped, another is horizontally flipped, another has random noise added, another has color jitter adjusted, and other instances undergo various modifications or combinations of these adjustments. The boundary identification system 206 uses TTA to introduce diversity in the inversion result image 404 that the ensemble image model 310 encounters during inference, thus improving accuracy. This approach is similar to how data augmentation is applied during training to expose the model to a broader range of variations and conditions.

In implementations where the boundary identification system 206 provides both the inversion result image 404 and the test-time augmented image set 406 to the ensemble image model 310, the boundary identification system 206 provides a copy of the same images (e.g., including instance variations) to each of the image-to-image machine-learning models. In certain instances, the boundary identification system 206 provides different versions of the test-time augmented image set 406 to the different image-to-image machine-learning models.

In some implementations, upon receiving the inversion result image 404 and the test-time augmented image set 406, the first image-to-image machine-learning model 312 generates distinct instances of the first initial image mask for each input image. These are then provided to the ensembler 320 to be combined. Similarly, the second image-to-image machine-learning model 314 produces separate instances of the second initial image mask for each input image, which are also combined by the ensembler 320.

In one or more implementations, upon receiving the inversion result image 404 and the test-time augmented image set 406, the first image-to-image machine-learning model 312 receives multiple separate input images but generates a single version of the first initial image mask image 316. This single version is then provided to the ensembler 320 for combination with a corresponding single version of the second initial image mask image 318, which is generated from the multiple separate input images by the second image-to-image machine-learning model 314. In such cases, the image-to-image machine-learning models collaboratively process the separate input images, potentially at the feature vector level or another stage, before generating a unified initial image mask output.

As previously mentioned above, the image mask 322 generated by the ensemble image model 310 shows masked areas determined to belong to a reservoir (or another trained geological feature). In some instances, the image mask 322 includes levels of uncertainty determined by the ensemble image model 310 (e.g., with percentage labels or grayscale-masked pixels). In various implementations, the boundary identification system 206 uses an algorithm or model to extract the reservoir boundaries (e.g., top, bottom, and/or side borders) from the image mask 322. In some instances, the algorithm includes smoothing or other features to obtain the reservoir boundaries. Further, the boundary identification system 206 may use the reservoir boundaries to add labels indicating the position and/or location of the reservoir boundaries.

As shown in FIG. 4, the augmented inversion result image 434 includes labels added by the boundary identification system 206. For example, the boundary identification system 206 augments the inversion result image 404 with labels of the reservoir boundaries extracted from the image mask 322. In particular, the boundary identification system 206 adds a first label indicating the top reservoir boundary and a second label indicating the bottom reservoir boundary to the inversion result image 404.

After generating the augmented inversion result image 434, the boundary identification system 206 may combine it with other augmented inversion result images of the inversion result profile 402 to create the augmented inversion result profile 432. In some instances, the boundary identification system 206 adds the augmented inversion result image 434 to an existing augmented inversion result profile to expand the existing augmented inversion result profile.

As mentioned previously above, the boundary identification system 206 may receive real-time data to create an expanding inversion result profile. In these instances, as real-time data arrives and the inversion result profile expands, the boundary identification system 206 processes the newly received data with the ensemble image model 310 to generate the augmented inversion result profile in real time. This way, the boundary identification system 206 provides real-time results of reservoir boundaries.

As shown, FIG. 4 also includes downstream applications 440. In various implementations, the boundary identification system 206 uses the augmented inversion result profile 432 and/or the augmented inversion result image 434 for downstream applications 440. One example is automated geosteering. For instance, the augmented inversion result profile 432 is used to adjust a drill bit's trajectory to avoid contact with a reservoir boundary. Another example is using the augmented inversion result profile 432 to define zones of interest such as the distribution of lithology.

As a further example, the augmented inversion result profile 432 is used in downstream models and workflows. For example, the boundary identification system 206 uses the augmented inversion result profile 432 to improve the accuracy of other models that map subsurface geological features. For instance, the boundary identification system 206 provides the augmented inversion result profile 432 as an input to a system that performs petrophysics modeling.

In some implementations, the augmented inversion result profile 432 and/or the augmented inversion result image 434 are reviewed by a user. For example, a WPE reviews the reservoir boundary labels and makes necessary boundary adjustments. The boundary identification system 206 may then incorporate these inputs to further train the image-to-image machine-learning models of the ensemble image model 310. In some implementations, a WPE uses the augmented results to determine corrections to a trajectory path or to make other decisions.

FIG. 5 illustrates a block diagram example of generating training data from real-world data. As shown, FIG. 5 includes a series of acts 500 that the boundary identification system 206 performs to generate training data. Additionally, FIG. 5 includes the labeled inversion result profiles 304, the sampled inversion images 306, and the sampled image masks 308 introduced earlier.

The series of acts 500 includes act 502 of receiving a labeled inversion result profile from real-world data. For example, the boundary identification system 206 obtains an inversion result profile (in particular, a longitudinal electromagnetic inversion result profile) from real-world data that includes labels indicating reservoir boundaries.

In some implementations, a WPE or another user manually labels inversion result profiles to indicate reservoir boundaries and/or other geological features. In some instances, the boundary identification system 206 uses labeled inversion result profiles from different wellbore locations and/or wellbore locations measured at different times. In some instances, the labeled inversion result profile is provided in real-time as resistivity measurement data is received and labeled by a user across an inversion result profile and/or corresponding inversion images.

In various implementations, the boundary identification system 206 generates and/or obtains an inversion result profile pair that includes the labeled inversion result profile and the corresponding original or unlabeled inversion result profile. In some implementations, the inversion result profile includes 1D, 2D, and/or 3D images. Indeed, the boundary identification system 206 may process images in different dimensions. For example, the labeled inversion result profiles 304 in FIG. 5 shows a 1D inversion result profile with reservoir boundary labels.

In some implementations, the training data includes a small amount of data. For example, the boundary identification system 206 generates the training data from a set of around 300 inversion result profiles. Researchers have found that the ensemble image model disclosed in this document, and trained with a small dataset, has an accuracy rate of over 90% compared to test samples/results not seen in training. Additionally, these results were obtained by inferring the ensemble image model with real-time data. Further, as the data set grows, the accuracy of the ensemble image model increases. Moreover, unlike manual labeling by different WPEs, which results in inconsistent and sometimes incorrect results, the boundary identification system achieved consistent results.

As shown, the series of acts 500 includes an act 504 of aligning the inversion result profile. For example, the boundary identification system 206 aligns the inversion images to a common depth relative to the surface and/or wellbore. This way, the boundary identification system 206 accounts for shifts in the measured data when the true vertical depth (TVD) of each inversion bar and/or inversion image is different.

As shown, the series of acts 500 includes an act 506 of generating sample images by slicing the inversion result profile into random widths. For instance, the boundary identification system 206 generates a set of sample images by dividing, slicing, splitting, clipping, and/or capturing the inversion result profile into images of different widths. In various instances, the boundary identification system 206 maintains the same image height but varies the image widths. In some instances, the boundary identification system 206 overlaps portions of the inversion result profile when generating the sample image set. In various implementations, the boundary identification system 206 divides the inversion result profile into a set of sample images without overlapping portions.

In various implementations, the boundary identification system 206 generates a pair of sample images that includes a labeled subset and an unlabeled subset. For instance, when generating a sample image with a random width from a labeled inversion result profile, the boundary identification system 206 also creates a labeled sample image with the same width and from the corresponding location of the corresponding labeled inversion result profile.

As shown, the series of acts 500 includes an act 508 of interpolating the sample images into square sample images. In one configuration, the boundary identification system 206 uses one or more interpolation models or algorithms to convert the sample images (and their corresponding labeled mask pair) into square sample images. For example, the boundary identification system 206 generates a set of sample images where both the height and width are 512 pixels. In some instances, the height and width may have other dimensions. Further, in some instances, the boundary identification system 206 interpolates the sample images to the same width while maintaining the same height. In various implementations, the boundary identification system 206 omits this step and does not resize the sample image set.

As shown, the series of acts 500 includes an act 510 of generating sample image pairs of labeled and unlabeled images. As mentioned above, the boundary identification system 206 generates the sets of sample images in pairs, which include sampled inversion images 306 and sampled image masks 308 (e.g., labeled sample images) corresponding to the sampled inversion images 306. In some implementations, the boundary identification system 206 generates these pairs sequentially, starting with either the labeled or unlabeled images. In one or more implementations, the boundary identification system 206 generates the sample image pair in parallel.

The boundary identification system 206 may repeat the series of acts 500 for different versions of the labeled inversion result profiles 304 to create various sets of sample image data for training the ensemble image model. Once generated, the boundary identification system 206 uses this training data to train the image-to-image machine-learning models within the ensemble image model, as mentioned previously.

Additionally, the boundary identification system 206 may use labeled inversion result profiles generated by the ensemble image model 310 and manually corrected by a WPE to augment the training data to further fine-tune the image-to-image machine-learning models within the ensemble image model, as also mentioned above.

Figure 6:
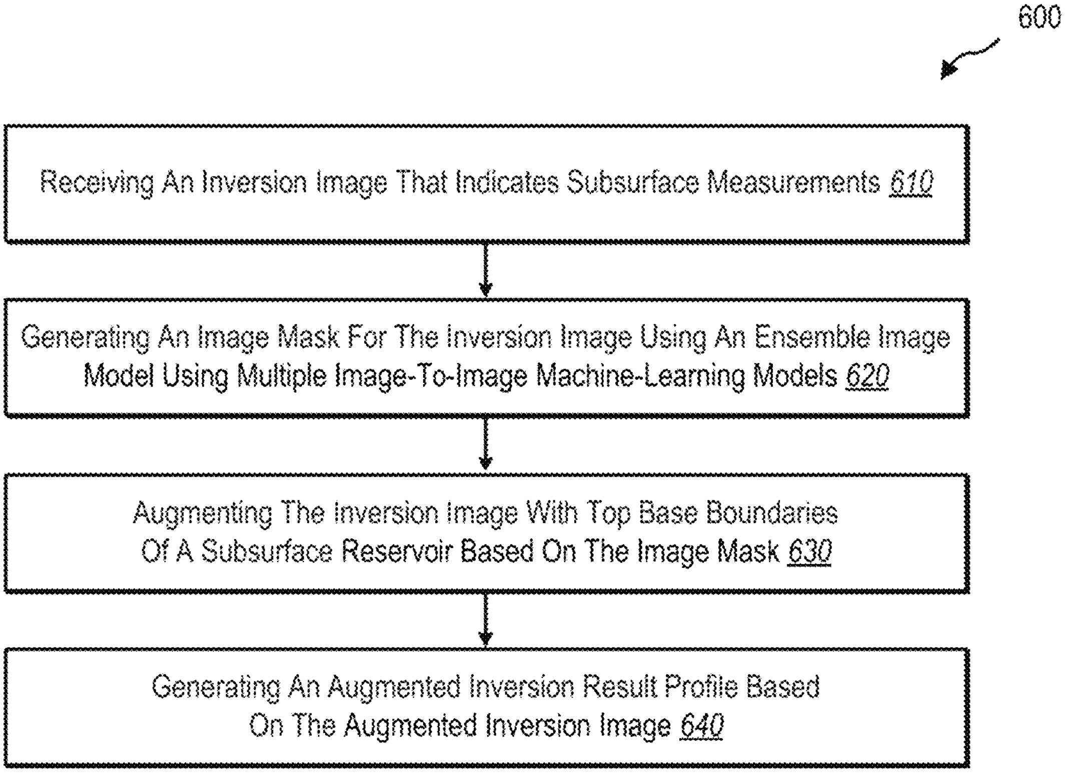
FIG. 6 illustrates an example series of acts of a computer-implemented method for automatically determining subsurface reservoir boundaries in a drilling system using image-to-image machine-learning models.

Now turning to FIG. 6, this figure illustrates an example flowchart that includes a series of acts 600 for using the boundary identification system according to some implementations. In particular, FIG. 6 illustrates an example series of acts representing a computer-implemented method for automatically determining subsurface reservoir boundaries in a drilling system using image-to-image machine-learning models according to some implementations.

While FIG. 6 illustrates acts according to one or more implementations, alternative implementations may omit, add to, reorder, and/or modify any of the acts shown. Furthermore, the acts of FIG. 6 may be performed as part of a method (e.g., a computer-implemented method). Alternatively, a computer-readable medium may include instructions that, when executed by a processing system having a processor, cause a computing device to perform the acts of FIG. 6.

In some implementations, a system (e.g., a processing system comprising a processor) may perform the acts of FIG. 6. For example, the acts include a system that includes a processing system and a computer memory including instructions that, when executed by the processing system, cause the system to perform various actions or steps.

As shown, the series of acts 600 includes an act 610 of receiving an inversion image that indicates subsurface measurements. For instance, in example implementations, the act 610 involves receiving an inversion image that forms part of a longitudinal electromagnetic inversion result profile that indicates subsurface measurements captured by a downhole resistivity sensor.

As further shown, the series of acts 600 includes an act 620 of generating an image mask for the inversion image using an ensemble image model using multiple image-to-image machine-learning models. For instance, in example implementations, the act 620 involves generating an image mask for the inversion image using an ensemble image model that enables initial image masks outputted from multiple image-to-image machine-learning models to be incorporated into the image mask.

As further shown, the series of acts 600 includes an act 630 of augmenting the inversion image with top and base boundaries of a subsurface reservoir based on the image mask. For instance, in example implementations, the act 630 involves augmenting the inversion image with a top boundary and a base boundary of a subsurface reservoir based on the image mask to generate an augmented inversion image.

As further shown, the series of acts 600 includes an act 640 of generating an augmented inversion result profile based on the augmented inversion image. For instance, in example implementations, the act 640 involves generating an augmented longitudinal electromagnetic inversion result profile based on the augmented inversion image.

In some instances, the series of acts 600 includes additional acts. For example, in some cases, the inversion image is received in real time as a recent addition to the longitudinal electromagnetic inversion result profile as additional subsurface measurements are captured by the downhole resistivity sensor. In some cases, generating the ensemble image model includes: a first image-to-image machine-learning model that generates a first initial image mask; a second image-to-image machine-learning model that generates a second initial image mask; and the first image-to-image machine-learning model differs from the second image-to-image machine-learning model. In some cases, generating the image mask for the inversion image using the ensemble image model includes combining the first initial image mask with the second initial image mask to generate the image mask.

In some implementations, the series of acts 600 includes using the augmented inversion image to adjust a drilling parameter of a downhole drill within a wellbore subsurface reservoir based on the augmented inversion image. In some cases, adjusting the drilling parameter of the downhole drill automatically adjusts a geosteering direction of the downhole drill.

In some cases, the series of acts 600 includes using the augmented longitudinal electromagnetic inversion result profile in a downstream subsurface prediction model to generate subsurface models with improved accuracy. In some cases, generating the image mask for the inversion image using the ensemble image model includes generating a set of inversion images from the inversion image by applying test-time augmentations to different instances of the inversion image. In some cases, the test-time augmentations include horizontal image flipping, vertical image flipping, random image rotation up to 90 degrees, random brightness modification, random contrast modification, color jitter modification, or Gaussian noise modification.

In various aspects, generating the image mask for the inversion image using the ensemble image model further includes: providing the set of inversion images to a first image-to-image machine-learning model and a second image-to-image machine-learning model of the multiple image-to-image machine-learning models; generating a first initial image mask using the first image-to-image machine-learning model; generating a second initial image mask using the second image-to-image machine-learning model;

and combining the first initial image mask with the second initial image mask to generate the image mask. In some cases, the second image-to-image machine-learning model includes a more complex architecture than the first image-to-image machine-learning model and the second initial image mask is more detailed than the first initial image mask. In some cases, the first image-to-image machine-learning model is based on a U-Net architecture and/or the second image-to-image machine-learning model is based on a U-Net++ or U-Net With Attention Gates architecture.

In various implementations, the series of acts 600 includes generating a training dataset from real-time inversion image data by receiving a labeled longitudinal electromagnetic inversion result profile; aligning the labeled longitudinal electromagnetic inversion result profile to a common depth; generating a set of training images by slicing the labeled longitudinal electromagnetic inversion result profile into sample images of random widths and a fixed height; interpolating the sample images into square sample images; and pairing unlabeled versions of the square sample images with corresponding image masks of the square sample images to generate the training dataset.

In some implementations, the series of acts 600 includes training the multiple image-to-image machine-learning models using the training dataset. In various implementations, the series of acts 600 includes receiving label feedback adjusting a boundary in the augmented inversion image or the augmented longitudinal electromagnetic inversion result profile; generating updated multiple image-to-image machine-learning models based on the label feedback; receiving an additional inversion image of the longitudinal electromagnetic inversion result profile after updating the multiple image-to-image machine-learning models; generating an additional augmented inversion image using the updated multiple image-to-image machine-learning models; and providing a further augmented longitudinal electromagnetic inversion result profile using the additional augmented inversion image.

In one or more implementations, the techniques described herein relate to a computer-implemented method for automatically determining subsurface reservoir boundaries, including receiving an inversion image that forms part of a longitudinal electromagnetic inversion result profile that indicates subsurface measurements captured by a downhole resistivity sensor; generating an image mask for the inversion image using an ensemble image model that enables initial image masks outputted from multiple image-to-image machine-learning models into the image mask; and augmenting the inversion image with a top boundary and a base boundary of a subsurface reservoir based on the image mask to generate an augmented inversion image.

In some cases, the techniques described herein relate to a computer-implemented method, further including generating an augmented longitudinal electromagnetic inversion result profile based on the augmented inversion image. In some cases, the techniques described herein relate to a computer-implemented method, further including using the augmented inversion image to adjust a drilling parameter of a downhole drill within a wellbore subsurface reservoir based on the augmented inversion image.

In some cases, the techniques described herein relate to a system, including a downhole resistivity sensor associated with a downhole drill; and a processing system and memory, the memory including instructions which, when accessed by the processing system cause the processing system to perform operations of: receiving an inversion image that forms part of a longitudinal electromagnetic inversion result profile that indicates subsurface measurements captured by the downhole resistivity sensor; generating an image mask for the inversion image using an ensemble image model that enables initial image masks outputted from multiple image-to-image machine-learning models into the image mask; augmenting the inversion image with a top boundary and a base boundary of a subsurface reservoir based on the image mask to generate an augmented inversion image; and generating an augmented longitudinal electromagnetic inversion result profile based on the augmented inversion image. In some cases, the techniques described herein relate to a system, where the operations further include generating the image mask by combining the initial image masks from the multiple image-to-image machine-learning models into the image mask.

Figure 7:
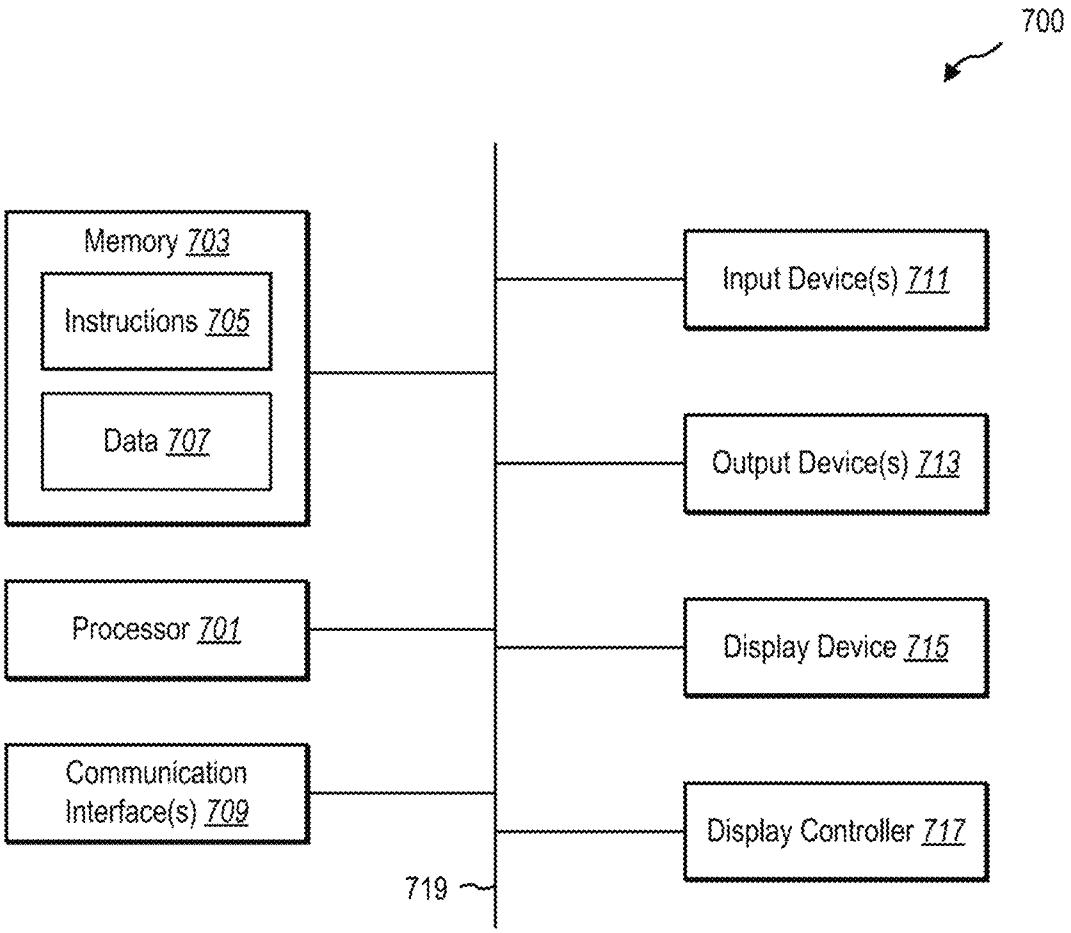
FIG. 7 illustrates example components included within a computer system.

FIG. 7 illustrates certain components that may be included within a computer system 700. The computer system 700 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single-or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU) and may cause computer-implemented instructions to be performed. Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory

703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may use any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media may include a network and/or data links that carry required program code in the form of computer-executable instructions or data structures, which may be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures may be transferred automatically from transmission media to non-transitory computer-readable storage media (devices), or vice versa. For example, computer-executable instructions or data structures received over a network or data link may be buffered in random-access memory (RAM) within a network interface module (NIC), and then it is eventually transferred to computer system RAM and/or to less volatile computer storage media (devices) at a computer system. Thus, it should be understood that computer-readable storage media (devices) may be included in computer system components that also (or even primarily) use transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media may be any available media that may be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure may include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which may be used to store desired program code means in the form of computer-executable instructions or data structures and which may be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" may include calculating, computing, processing, deriving, investigating, looking up (e.g., looking up in a table, a data repository, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for automatically determining subsurface reservoir boundaries in a drilling system, comprising:

receiving an inversion image that forms part of a longitudinal electromagnetic inversion result profile that indicates subsurface measurements captured by a downhole resistivity sensor;

generating a set of inversion images from the inversion image using multiple image-to-image machine-learning models, wherein the multiple image-to-image machine-learning models are trained using respective training datasets having image masks of different segmentation granularities such that a first model of the multiple image-to-image machine-learning models is trained to generate a first image mask having a first level of spatial detail and a second model of the multiple image-to-image machine-learning models is trained to generate a second image mask having a second level of spatial detail, wherein generating the set of inversion images using the multiple image-to-image machine-learning models includes applying test-time augmentations to different instances of the inversion image, and wherein the test-time augmentations include horizontal image flipping, vertical image flipping, random image rotation up to 90 degrees, random brightness modification, random contrast modification, color jitter modification, or Gaussian noise modification;

generating, via each of the multiple image-to-image machine-learning models, a plurality of initial image masks corresponding to the set of inversion images;

aggregating the plurality of initial image masks generated from the set of inversion images and from the multiple image-to-image machine-learning models by majority vote of predicted probabilities corresponding to pixels across the plurality of initial image masks to generate an image mask;

augmenting the inversion image with a top boundary and a base boundary of a subsurface reservoir based on the image mask to generate an augmented inversion image; and generating an augmented longitudinal electromagnetic inversion result profile based on the augmented inversion image.

2. The computer-implemented method of claim 1, wherein the inversion image is received in real time as a recent addition to the longitudinal electromagnetic inversion result profile as additional subsurface measurements are captured by the downhole resistivity sensor.

3. The computer-implemented method of claim 1, wherein generating the multiple image-to-image machine-learning models includes:

a first image-to-image machine-learning model that generates a first initial image mask; and a second image-to-image machine-learning model that generates a second initial image mask;

wherein the first image-to-image machine-learning model differs from the second image-to-image machine-learning model.

4. The computer-implemented method of claim 3, wherein generating the image mask for the inversion image using the multiple image-to-image machine-learning models includes combining the first initial image mask with the second initial image mask to generate the image mask.

5. The computer-implemented method of claim 1, further comprising using the augmented inversion image to adjust a drilling parameter of a downhole drill within a wellbore subsurface reservoir based on the augmented inversion image.

6. The computer-implemented method of claim 5, wherein adjusting the drilling parameter of the downhole drill automatically adjusts a geosteering direction of the downhole drill.

7. The computer-implemented method of claim 1, further comprising using the augmented longitudinal electromagnetic inversion result profile in a downstream subsurface prediction model to generate subsurface models representing subsurface reservoir characteristic.

8. The computer-implemented method of claim 1, wherein generating the image mask for the inversion image using the multiple image-to-image machine-learning models further includes:

providing the set of inversion images to a first image-to-image machine-learning model of the multiple image-to-image machine-learning models and a second image-to-image machine-learning model of the multiple image-to-image machine-learning models;

generating a first initial image mask using the first image-to-image machine-learning model;

generating a second initial image mask using the second image-to-image machine-learning model; and combining the first initial image mask with the second initial image mask to generate the image mask.

9. The computer-implemented method of claim 8, wherein:

the second image-to-image machine-learning model includes a different neural network architecture than the first image-to-image machine-learning model; and the second initial image mask is more detailed than the first initial image mask.

10. The computer-implemented method of claim 9 wherein:

the first image-to-image machine-learning model is based on a U-Net architecture; and the second image-to-image machine-learning model is based on a U-Net++ or U-Net With Attention Gates architecture.

11. The computer-implemented method of claim 1, further comprising generating a training dataset from real-time inversion image data by:

receiving a labeled longitudinal electromagnetic inversion result profile;

aligning the labeled longitudinal electromagnetic inversion result profile to a common depth;

generating a set of training images by slicing the labeled longitudinal electromagnetic inversion result profile into sample images of random widths and a fixed height;

interpolating the sample images into square sample images; and pairing unlabeled versions of the square sample images with corresponding image masks of the square sample images to generate the training dataset.

12. The computer-implemented method of claim 11, further comprising training the multiple image-to-image machine-learning models using the training dataset.

13. The computer-implemented method of claim 1, further comprising:

receiving label feedback adjusting a boundary in the augmented inversion image or the augmented longitudinal electromagnetic inversion result profile;

generating updated multiple image-to-image machine-learning models based on the label feedback;

receiving an additional inversion image of the longitudinal electromagnetic inversion result profile after updating the multiple image-to-image machine-learning models;

generating an additional augmented inversion image using the updated multiple image-to-image machine-learning models; and providing a further augmented longitudinal electromagnetic inversion result profile using the additional augmented inversion image.

14. The computer-implemented method of claim 1, whereun each of the multiple image-to-image machine-learning models generates a distinct initial image mask for each inversion image within the set of inversion images.

15. A system comprising:

memory; and at least one processor for executing computer readable program code stored in memory and configured to:

receive an inversion image that forms part of a longitudinal electromagnetic inversion result profile that indicates subsurface measurements captured by a downhole resistivity sensor;

generate a set of inversion images from the inversion image using multiple image-to-image machine-learning models, wherein the multiple image-to-image machine-learning models are trained using respective training datasets having image masks of different segmentation granularities such that a first model of the multiple image-to-image machine-learning models is trained to generate a first image mask having a first level of spatial detail and a second model of the multiple image-to-image machine-learning models is trained to generate a second image mask having a second level of spatial detail, wherein generating the set of inversion images using the multiple image-to-image machine-learning models includes applying test-time augmentations to different instances of the inversion image, and wherein the test-time augmentations include horizontal image flipping, vertical image flipping, random image rotation up to 90 degrees, random brightness modification, random contrast modification, color jitter modification, or Gaussian noise modification;

generate, via each of the multiple image-to-image machine-learning models, a plurality of initial image masks corresponding to the set of inversion images;

aggregate the plurality of initial image masks generated from the set of inversion images and from the multiple image-to-image machine-learning models by majority vote of predicted probabilities corresponding to pixels across the plurality of initial image masks to generate an image mask;

augment the inversion image with a top boundary and a base boundary of a subsurface reservoir based on the image mask to generate an augmented inversion image; and generate an augmented longitudinal electromagnetic inversion result profile based on the augmented inversion image.

16. A computer program product comprising computer readable program code for causing a computer system to:

receive an inversion image that forms part of a longitudinal electromagnetic inversion result profile that indicates subsurface measurements captured by a downhole resistivity sensor;

generate a set of inversion images from the inversion image using multiple image-to-image machine-learning models, wherein the multiple image-to-image machine-learning models are trained using respective training datasets having image masks of different segmentation granularities such that a first model of the multiple image-to-image machine-learning models is trained to generate a first image mask having a first level of spatial detail and a second model of the multiple image-to-image machine-learning models is trained to generate a second image mask having a second level of spatial detail, wherein generating the set of inversion images using the multiple image-to-image machine-learning models includes applying test-time augmentations to different instances of the inversion image, and wherein the test-time augmentations include horizontal image flipping, vertical image flipping, random image rotation up to 90 degrees, random brightness modification, random contrast modification, color jitter modification, or Gaussian noise modification;

generate, via each of the multiple image-to-image machine-learning models, a plurality of initial image masks corresponding to the set of inversion images;

aggregate the plurality of initial image masks generated from the set of inversion images and from the multiple image-to-image machine-learning models by majority vote of predicted probabilities corresponding to pixels across the plurality of initial image masks to generate an image mask;

augment the inversion image with a top boundary and a base boundary of a subsurface reservoir based on the image mask to generate an augmented inversion image; and generate an augmented longitudinal electromagnetic inversion result profile based on the augmented inversion image.

* * * * *